(12) United States Patent
Endo et al.

(10) Patent No.: US 7,696,709 B2
(45) Date of Patent: Apr. 13, 2010

(54) ELECTRIC POWER STEERING APPARATUS AND CONTROLLER THEREFOR

(75) Inventors: Shuji Endo, Gunma (JP); Hideyuki Kobayashi, Gunma (JP)

(73) Assignee: NSK Ltd., Tokyo (JP)

( * ) Notice: Subject to any disclaimer, the term of this patent is extended or adjusted under 35 U.S.C. 154(b) by 703 days.

(21) Appl. No.: 11/586,571

(22) Filed: Oct. 26, 2006

(65) Prior Publication Data

US 2007/0096672 A1     May 3, 2007

(30) Foreign Application Priority Data

Oct. 28, 2005  (JP) .......................... P. 2005-314222
Feb. 14, 2006  (JP) .......................... P. 2006-035949

(51) Int. Cl.
*H02P 7/00* (2006.01)
(52) U.S. Cl. .......................... 318/432; 318/433; 318/434
(58) Field of Classification Search ................. 318/432, 318/433, 434, 400.02, 801, 811, 437, 561, 318/609, 632, 629; 180/443
See application file for complete search history.

(56) References Cited

U.S. PATENT DOCUMENTS

2003/0121716 A1* 7/2003 Yamada et al. .............. 180/446
2005/0183902 A1* 8/2005 Segawa et al. .............. 180/444

FOREIGN PATENT DOCUMENTS

| DE | 199 20 975 A1 | 4/2000 |
|---|---|---|
| EP | 1 138 577 A2 | 10/2001 |
| EP | 1 470 988 A | 10/2004 |
| EP | 1 683 705 A | 7/2006 |
| JP | 10-109655 A | 4/1998 |
| JP | 2001-073095 A | 3/2001 |
| JP | 2003-250254 A | 9/2003 |
| JP | 2005-067359 A | 3/2005 |
| WO | WO 2005/035333 A | 4/2005 |

\* cited by examiner

*Primary Examiner*—Karen Masih
(74) *Attorney, Agent, or Firm*—Sughrue Mion, PLLC

(57) ABSTRACT

There is provided a controller for an electric power steering apparatus having a motor which applies a steering assist force to a steering mechanism. The controller includes a torque command value calculating portion which calculates a torque command value based on steering torque generated in a steering shaft, and a vehicle speed and a current command value calculating portion which calculates a current command value for the motor based on the torque command value. The controller controls the motor based on the current command value. In the apparatus, the controller has a cogging torque compensation value calculating portion which calculates a cogging torque compensation value for the motor, and corrects the current command value based on the cogging torque compensation value.

13 Claims, 12 Drawing Sheets

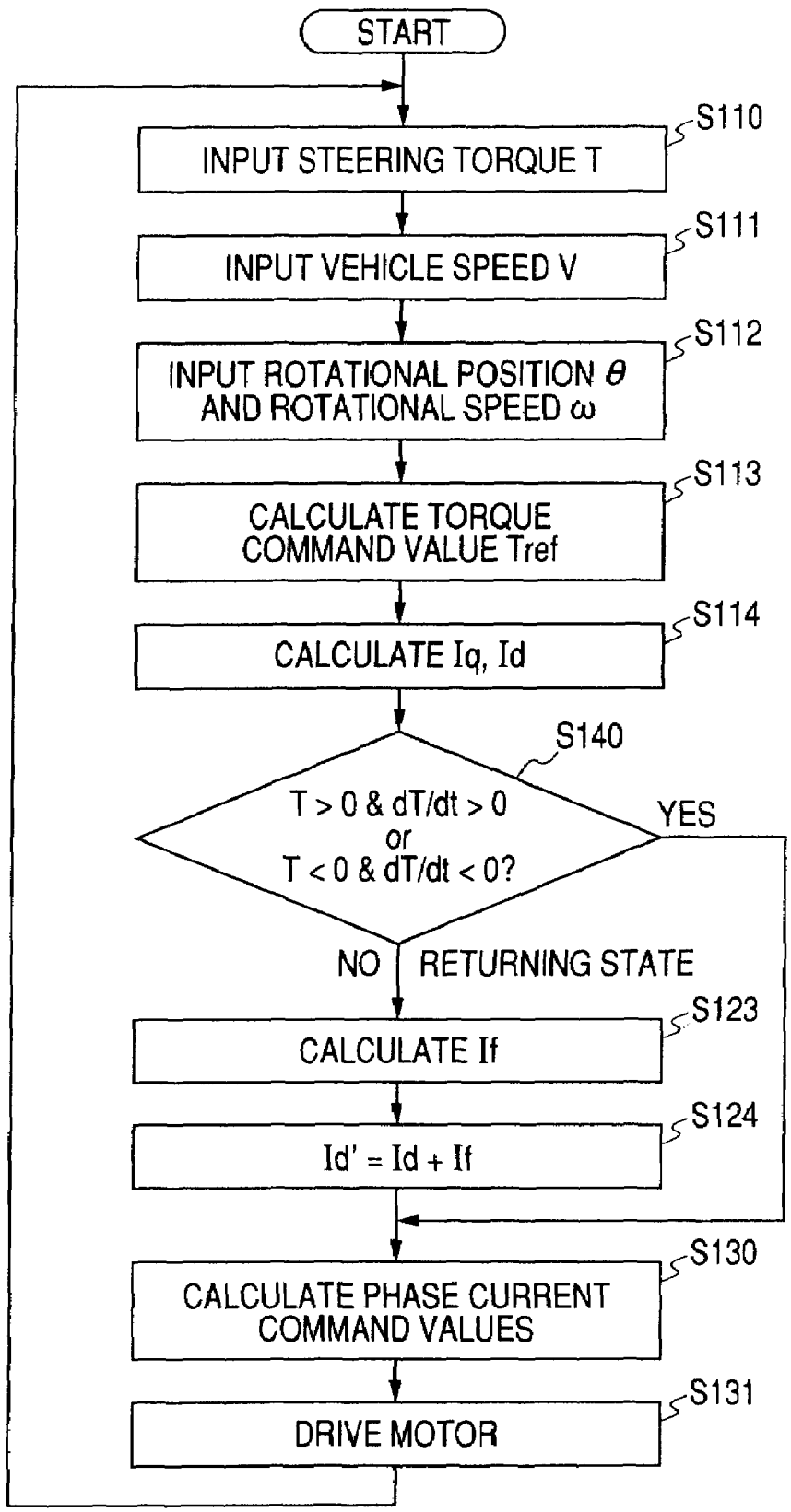

ELECTRIC POWER STEERING APPARATUS AND CONTROLLER THEREFOR

BACKGROUND OF THE INVENTION

1. Field of the Invention

The present invention relates to an electric power steering apparatus which gives a steering assist force to a steering system of an automobile or a vehicle by driving a brush-less DC motor.

Also, the invention relates to a controller for the apparatus, and more particularly to a high-performance electric power steering apparatus in which a cogging torque compensation value is added to a d-axis current command value to reduce the cogging torque of a motor, and also to a controller for the apparatus.

In addition, the invention also relates to a controller for the apparatus, and more particularly to an electric power steering apparatus in which a friction compensation flux-weakening current that is a friction compensation value is added to a d-axis current command value to reduce friction of a steering, and also to a controller for the apparatus.

2. Description of the Background Art

An electric power steering apparatus which auxiliary-load-energizes (assists) a steering apparatus of an automobile or a vehicle by means of a torque of a motor is configured so that a steering shaft or a rack shaft is auxiliary-load-energized with the driving force of the motor by a transmission mechanism such as gears and a belt via a reducer. Such a conventional electric power steering apparatus performs a feedback control of a motor current in order to correctly generate an assist torque (auxiliary steering force). In the feedback control, a voltage to be applied to the motor is adjusted so as to decrease the difference between a current command value and a motor current detection value. The motor-applied voltage is usually regulated by adjusting the duty ratio of a PWM (Pulse-Width Modulation) control.

A usual configuration of an electric power steering apparatus will be described with reference to FIG. 6. A column shaft 2 of a steering wheel 1 is coupled to a tie rod 6 of a steerable wheel through a reduction gear 3, universal joints 4A and 4B, and a rack and pinion mechanism 5. A torque sensor 10 which detects the steering torque of the steering wheel 1 is disposed on the column shaft 2. A motor 20 which assists the steering force of the steering wheel 1 is coupled to the column shaft 2 via the reduction gear 3. An electric power is supplied from a battery 14 to a control unit 30 which controls the power steering apparatus, and also an ignition key signal is supplied from an ignition key 11 to the control unit. Based on a steering torque value T detected by the torque sensor 10, and a vehicle speed V detected by a vehicle speed sensor 12, the control unit 30 calculates a steering assist command value I for an assist command with using an assist map, and controls the current to be supplied to the motor 20 based on the calculated steering assist command value I.

The control unit 30 is configured mainly by a CPU (or MPU or MCU). FIG. 7 shows usual functions to be executed by programs in the CPU.

Referring to FIG. 7, functions and operations of the control unit 30 will be described. The steering torque T detected by the torque sensor 10, and the vehicle speed V from the vehicle speed sensor 12 are supplied to a steering assist command value calculating portion 31, and a basic steering assist command value Iref1 is calculated. The calculated basic steering assist command value Iref1 is subjected to phase compensation by a phase compensating portion 32 in order to enhance the stability of the steering system, and a phase-compensated steering assist command value Iref2 is supplied to an adder 33. The steering torque T is supplied also to a differential compensating portion 35 of a feedforward system which is used for enhancing the response speed. A differential-compensated steering torque TS is supplied to the adder 33. The adder 33 adds the steering assist command value Iref2 and the steering torque TS together, and supplies an steering assist command value Iref3 which is the result of the addition, to a subtracting portion 34.

The subtracting portion 34 obtains a deviation (Iref3-i) between the steering assist command value Iref3 and the fed-back motor current i. The deviation (Iref3-i) is PI-controlled in a PI controlling portion 36, and then supplied to a PWM controlling portion 37 to calculate the duty, so that the motor 20 is PWM-driven through an inverter 38. The motor current i of the motor 20 is detected by motor current detecting means (not shown), and then supplied to the subtracting portion 34 to be fed back.

In the thus configured electric power steering apparatus, as the motor 20 which is a driving source, a DC motor or a brush-less DC motor is used. A brush-less DC motor has three or more exciting phases, and is driven by a rectangular or sinusoidal exciting current supplied from the control unit.

In an electric power steering apparatus comprising such a DC motor, in order to improve the steering feeling of the driver, it is preferable not to generate cogging torque (pulsation torque) of the motor.

In an electric power steering apparatus disclosed in Japanese Patent Unexamined Publication JP-A-2005-67359, a correction value which offsets the pulsation torque component of a motor is superimposed on a target current. However, the target current value which is output as torque from the motor is corrected, and hence the correction value and cogging torque which are not offset because of an error are produced as vibration.

In a permanent magnet brush-less motor disclosed in Japanese Patent Unexamined Publication JP-A-2003-250254, the pole and slot numbers at which cogging torque of a reduced degree is produced are set. In this configuration, however, the degree of freedom in the deign of the motor is reduced.

As described above, in a conventional controller, cogging torque of a motor is not considered. Even in the case where a vehicle travels at a high or medium speed and a steering wheel is slowly rotated, i.e., in the case where the driver perceptively feels the steering feeling, when the motor control is performed in the same manner as other cases, the cogging torque of the motor is transmitted as vibrations to the steering wheel, thereby causing a problem in that the steering feeling is impaired. When a control in which the control gain is reduced so as to always eliminate influences of high-frequency noises and the like, or which involves complex calculations for eliminating pulsation torque is performed, there arises a problem in that the follow-up property of the motor with respect to a control command value is impaired.

Also in the case where cogging torque of a motor is corrected as in JP-A-2005-67359, when correction is performed on the target current value which is output as torque from the motor, the correction value and pulsation torque (cogging torque) which are not offset because of an error are transmitted as a torque ripple from the steering wheel to the driver.

Also in the case where cogging torque is reduced by the structure of a motor as in Japanese Patent Unexamined Publication JP-A-2003-250254, there is a problem in that the degree of freedom in the deign of the motor is largely reduced, for example, a motor which is frequently used, and in which the ratio of the pole number to the slot number is 2:3 is excluded.

Furthermore, in an electric power steering apparatus comprising such a DC motor as shown in FIGS. 6 and 7, it is requested to improve the on-center feeling of the steering wheel. However, the torque loop response in the vicinity of the center is insufficient, and hence mechanical or electromagnetic loss torque must be compensated. Also when the steering wheel is caused to return by self-aligning torque (SAT), mechanical or electromagnetic loss torque must be compensated in order to enable the steering wheel to return to the neutral position. In order to reduce the swing of the steering wheel to allow the steering wheel to rapidly return to the neutral position, damping must be applied to an electric power steering system in accordance with the rotational speed of the motor.

The loss torque is part of the output torque of the motor, and means a frictional loss based on the structure of the motor, and a loss which is produced by an electromagnetic cause. When a slight steering operation is performed in a straight traveling state, such a torque loss causes an unintended force to be applied in the steering direction, or a force in the opposite direction to be applied, thereby impairing the steering feeling. As a countermeasure against this, a method in which the current command value is increased by a degree corresponding to loss torque has been proposed. In the method, when a small drift is produced in a detection value of the steering torque, however, an auxiliary steering force is applied in the direction opposite to the steering direction, thereby causing a problem in that, when the steering wheel tries to return, the method does not operate effectively. This problem easily arises particularly when the steering operation is performed in the vicinity of the center in a high-speed traveling state.

In the technique disclosed in Japanese Patent Unexamined Publication JP-A-10-109655, attention is focused on the fact that loss torque is a function in the rotational direction of a motor, and a loss torque compensation value based on the motor rotational direction which is detected from an estimate value of the angular velocity of the motor is added to a current command value.

When the loss torque compensation or the damping application is to be performed, however, it is required to detect the rotational direction or rotational speed of the motor. When means for detecting such a value is disposed, the number of components of the electric power steering apparatus is increased. Furthermore, the detection accuracy of the means must satisfy the performance requested in the electric power steering apparatus. Therefore, the cost of the electric power steering apparatus is increased.

As a motor in which loss torque is reduced, Japanese Patent Unexamined Publication JP-A-2001-73095 discloses a PM (Permanent Magnet) motor in which loss torque of the motor is reduced by improving the content ratios of materials of a steel plate and the production method. However, the motor has a problem in that the material and production costs of the motor are increased.

SUMMARY OF THE INVENTION

The invention has been conducted under the above-described circumstances. It is an object of the invention to provide at low cost an electric power steering apparatus in which cogging torque is reduced without restricting the degree of freedom of a motor, and a controller for the apparatus. Further, it is another object of the invention to provide at low cost an electric power steering apparatus in which friction is reduced, and a controller for the apparatus.

According to a first aspect of the invention, there is provided a controller for an electric power steering apparatus comprising a motor which applies a steering assist force to a steering mechanism, the controller comprising;

a torque command value calculating portion which calculates a torque command value based on a steering torque generated in a steering shaft, and a vehicle speed;

a current command value calculating portion which calculates a current command value for the motor based on the torque command value, the motor being controlled based on the current command value; and a cogging torque compensation value calculating portion which calculates a cogging torque compensation value for the motor, wherein the current command value is corrected based on the cogging torque compensation value.

Further, according to a second aspect of the invention, as set forth in the first aspect of the invention, it is preferable that the cogging torque compensation value calculating portion calculates the cogging torque compensation value based on the steering torque and the vehicle speed.

Furthermore, according to a third aspect of the invention as set forth in the first aspect of the invention, it is more preferable that the current command value calculating portion calculates a d-axis current command value and a q-axis current command value in d-q axes of the motor, and corrects the d-axis current command value based on the cogging torque compensation value so as to weaken flux of the motor.

According to a fourth aspect of the invention, as set forth in the third aspect of the invention, it is furthermore preferable that the cogging torque compensation value is a function of the steering torque.

According to a fifth aspect of the invention, as set forth in the fourth aspect of the invention, it is suitable that the function has characteristics that outputs a cogging torque compensation value which is more decreased as an absolute value of the steering torque is increased.

According to a sixth aspect of the invention, as set forth in the first aspect of the invention, it is more suitable that correction of the current command value according to the cogging torque compensation value is switched over in accordance with predetermined conditions.

According to a seventh aspect of the invention, there is provided an electric power steering apparatus comprising:

a motor which applies a steering assist force to a steering mechanism;

a torque sensor which detects steering torque generated in a steering shaft; and a rotational speed detecting portion which detects a rotational speed of the motor, wherein, when a vehicle speed is higher than a predetermined value, the steering torque is equal to or smaller than predetermined torque, and the rotational speed is equal to or lower than a predetermined rotational speed, a cogging torque compensation value is added to a d-axis current value in d-q axes of the motor so as to correct the d-axis current value.

According to the controller for an electric power steering apparatus of the invention, the d-axis current command value which controls the flux strength based on the cogging torque compensation value is corrected so as to weaken the flux, whereby cogging torque is physically reduced. When the steering wheel returns to the center position in a state where the driver is susceptible to feel cogging torque, i.e., in a low-speed traveling state, or when a steering operation is performed in the vicinity of the center in a high- or medium-speed straight traveling state, therefore, the steering feeling can be improved.

Further, according to an eighth aspect of the invention, there is provided a controller for an electric power steering apparatus comprising a motor which applies a steering assist force to a steering mechanism, the controller comprising:

a torque command value calculating portion which calculates a torque command value based on a steering torque generated in a steering shaft and a vehicle speed;

a current command value calculating portion which calculates a current command value for the motor based on the torque command value, the motor being controlled based on the current command value; and a friction compensation value calculating portion which calculates a friction compensation value for the motor, wherein the current command value is corrected based on the friction compensation value.

According to a ninth aspect of the invention, as set forth in the eighth aspect of the invention, it is preferable that the friction compensation value calculating portion calculates the friction compensation value based on the steering torque, the vehicle speed, and the rotational speed of the motor.

According to a tenth aspect of the invention, as set forth in the eighth aspect of the invention, it is preferable that the current command value calculating portion calculates a d-axis current command value and a q-axis current command value in d-q axes of the motor, and corrects the d-axis current command value based on the friction compensation value so as to weaken a flux of the motor.

According to an eleventh aspect of the invention, as set forth in the ninth aspect of the invention, it is more preferable that the friction compensation value is a function of the steering torque, the vehicle speed, and the rotational speed of the motor.

According to a twelfth aspect of the invention, as set forth in the tenth aspect of the invention, it is preferable that the function has characteristics that outputs a friction compensation value which is decreased in accordance with an increase of an absolute value of the steering torque.

According to a thirteenth aspect of the invention, as set forth in the tenth aspect of the invention, it is preferable that the function has characteristics that outputs the friction compensation value, when the vehicle speed is equal to or higher than a predetermined vehicle speed value.

According to a fourteenth aspect of the invention, as set forth in the tenth aspect of the invention, it is preferable that the function has characteristics that outputs the friction compensation value, when the rotational speed is equal to or lower than a predetermined rotational speed value.

According to a fifteenth aspect of the invention, as set forth in the ninth aspect of the invention, it is preferable that the controller further comprises a steering wheel returning state determining portion which determines a steering wheel returning state, and, when the steering wheel returning state is detected, adds the friction compensation value to the d-axis current command value to correct the command value.

According to a sixteenth aspect of the invention, there is provided an electric power steering apparatus comprising:

a motor which applies a steering assist force to a steering mechanism;

a torque sensor which detects steering torque generated in a steering shaft; and a rotational speed detecting portion which detects a rotational speed of the motor, wherein, when the steering torque is equal to or smaller than a predetermined torque value and the rotational speed is equal to or lower than a predetermined rotational speed value, a d-axis current value in d-q axes of the motor is set equal to or larger than a predetermined current value.

According to the controller for an electric power steering apparatus of the invention, the friction compensation flux-weakening current is calculated as the friction compensation value for the motor, and the friction compensation flux-weakening current is added to the d-axis current command value which controls the flux strength to weaken the flux of the motor, whereby the iron loss is physically reduced. Therefore, the rotational direction and speed of the motor can be detected at a required accuracy and at a low cost.

Moreover, conditions which are imposed on materials of a steel plate and the production method to reduce loss torque of the motor can be relaxed, and hence there is an effect that the motor can be produced at low cast.

BRIEF DESCRIPTION OF THE DRAWINGS

FIG. 12 is a flowchart showing an operation example in the case where a steering wheel returning state determining portion is provided.

DETAILED DESCRIPTION OF THE PREFERRED EMBODIMENTS

First Embodiment

At first, first and second embodiments relate to aspects of the invention in which a controller is provided with a cogging torque compensation value calculating portion is described.

Conventionally, reduction of cogging torque is performed by improving the structure of a motor as described in JP-A-2003-250254, or by performing correction so as to offset the torque with a target torque as described in JP-A-2005-67359. In the invention, by contrast, attention is focused on the principle of generation of cogging torque, and simple control logic can surely reduce the cogging torque without requiring addition of expensive hardware.

First, the principle of generation of cogging torque on which the invention is based will be described.

Usually, cogging torque is produced by a change of the magnetic energy in a gap in accordance with movement of a magnetic pole of a permanent magnet. The change of the magnetic energy is caused by a winding slot. When θ is the movement angle of an armature portion with respect to the pole of the permanent magnet, and E(θ) is the magnetic energy of the whole gap, the cogging torque $T_{cg}$ can be expressed by following Expression 1.

$$T_{cg} = -\frac{\partial E(\theta)}{\partial \theta} \quad [\text{Ex. 1}]$$

On the other hand, a magnetic energy ΔE(θ) per minute volume dφ at an arbitrary angle in the gap can be expressed by following Expression 2 where $\mu_0$ is the magnetic permeability of air, and Bg(φ, θ) is a magnetic flux density of the gap.

$$\Delta E(\theta) = \frac{1}{2\mu_0} Bg^2(\phi, \theta) d\phi \quad [\text{Ex. 2}]$$

When P is the number of magnetic poles of the permanent magnet, the magnetic energy E(θ) of the whole gap becomes as following Expression 3.

$$E(\theta) = \frac{1}{2\mu_0} \int_0^{Pn} Bg^2(\phi, \theta) d\phi \quad [\text{Ex. 3}]$$

Therefore, the cogging torque $T_{cq}$ can be expressed by following Expression 4.

$$T_{cg} = -\frac{1}{2\mu_0} \frac{\partial}{\partial \theta} \int_0^{Pn} Bg^2(\phi, \theta) d\phi \quad [\text{Ex. 4}]$$

As described above, the conventional counter measure is taken by setting the relationships between the pole and slot numbers so that the energy in the gap is not changed by the movement angle θ of the armature portion, or by disposing slots in the magnet. By contrast, in the invention, in a traveling state where cogging torque is perceptively felt, a flux-weakening control is performed to reduce the magnetic flux density Bg(φ, θ) of the gap, whereby the cogging torque is surely decreased.

Hereinafter, an embodiment of the invention will be described with reference to the accompanying drawings. In the embodiment of the invention, an example in which a three-phase brush-less motor is used as a steering assist motor will be described.

Figure 1:
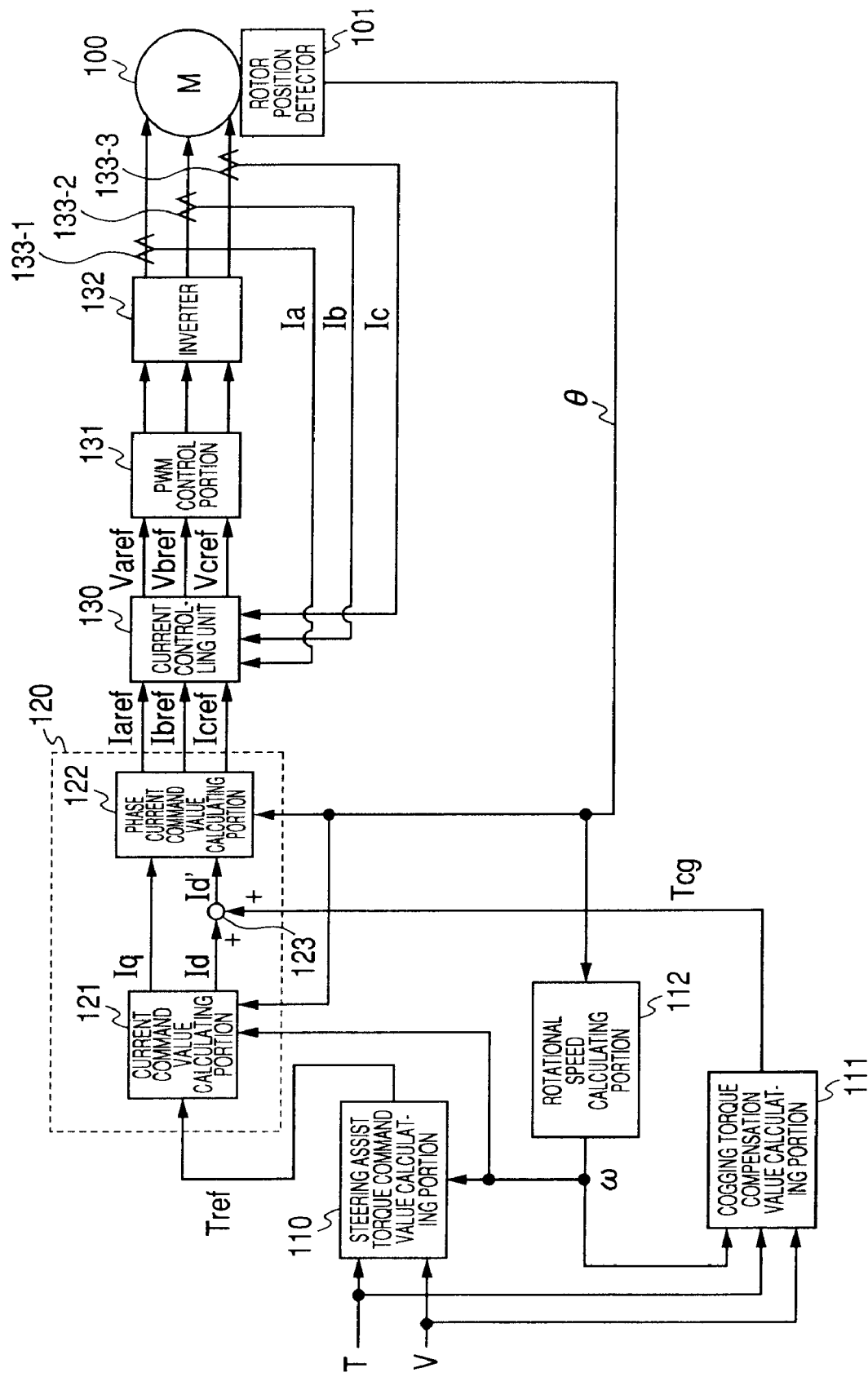
FIG. 1 is a block diagram showing a configuration example of the controller according to a first embodiment of the invention.

FIG. 1 shows a configuration example of the controller according to the invention. The three-phase brush-less motor 100 is drive-controlled by the vector control. In the vector control, the q-axis which is a coordinate axis of a rotor magnet, and which controls torque, and the d-axis for controlling the flux strength are independently set, and currents respectively corresponding to the axes are controlled by the vector because the axes are in a 90-deg. relationship. In the invention, a cogging torque compensation value Tcg which is calculated based on the steering torque T, the vehicle speed V, and the rotational speed ω is added to a d-axis current command value Id for the vector control, thereby performing the cogging torque compensation.

The cogging torque compensation is performed so that, when predetermined conditions are satisfied, i.e., when the vehicle speed V is higher than a predetermined value V0, the steering torque T is equal to or smaller than a predetermined value T0, and the rotational speed ω of the three-phase brush-less motor 100 is equal to or lower than a predetermined value ω0, the cogging torque compensation value Tcg is added to the d-axis current command value Id. The addition of the cogging torque compensation value Tcg to the d-axis current command value Id is performed by a switching based on the conditions.

The three-phase brush-less motor 100 which gives a steering assist force to a steering mechanism is provided with a rotor position detector 101 which detects the rotational position (angle) θ of the motor. The steering torque T from a torque sensor is supplied to a steering assist torque command value calculating portion 110 and a cogging torque compensation value calculating portion 111. The rotational position θ from the rotor position detector 101 is supplied to a rotational speed calculating portion 112 which calculates the rotational speed ω. The rotational speed ω is supplied to the steering assist torque command value calculating portion 110 and the cogging torque compensation value calculating portion 111, and also to a current command value calculating portion 121 in vector control phase current command value calculating unit 120, The rotational position θ is supplied also to the current command value calculating portion 121.

A torque command value Tref which is calculated by the steering assist torque command value calculating portion 110 based on the steering torque T, the vehicle speed V, and the rotational speed ω is supplied to the current command value calculating portion 121 in the vector control phase current command value calculating unit 120. Also the rotational speed ω from the rotational speed calculating portion 112, and the rotational position θ from the rotor position detector 101 are supplied to the current command value calculating portion 121. The current command value calculating portion 121 calculates a q-axis current command value Iq and the d-axis current command value Id based on the torque command value Tref, the rotational speed ω, and the rotational position θ. The q-axis current command value Iq and the d-axis current command value Id are supplied to a phase current command value calculating portion 122. The phase current command value calculating portion 122 calculates three-phase current command values Iaref, Ibref, Icref based on the q-axis current command value Iq, the d-axis current command value Id, and the rotational position θ.

The d-axis current command value Id from the current command value calculating portion 121 is not directly supplied to the phase current command value calculating portion 122, but added in an adder 123 to the cogging torque compensation value Tcg from the cogging torque compensation value calculating portion 111. A d-axis current command value Id' which is the addition value is supplied to the phase current command value calculating portion 122.

The three-phase current command values Iaref, Ibref, Icref calculated by the phase current command value calculating portion 122 are supplied to current controlling unit 130 as current command values for a feedback system to obtain deviations from phase currents Ia, Ib, Ic which are supplied respectively from current detectors 133-1, 133-2, 133-3 for detecting the phase currents of the motor. The current controlling unit 130 outputs voltage command values Varef, Vbref, Vcref on which a control such as the PI control has been performed. The voltage command values Varef, Vbref, Vcref are supplied to a PWM control portion 131 to drive the three-phase brush-less motor 100 through an inverter 132.

An example of the operation of the configuration will be described with reference to the flowchart of FIG. 2.

In the case where the steering wheel returns in a low-speed traveling state, or a steering operation is performed in the vicinity of the center in a high-speed straight traveling state, an assist current of the electric power steering apparatus is low in level, and hence the driver is susceptible to feel the cogging torque of the motor. In a steering state such as described above, therefore, the steering feeling may be impaired. In the invention, the cogging torque compensation value calculating portion 111 determines such a steering state based on the steering torque T, the vehicle speed V, and the rotational speed ω. In the case of a high-speed straight traveling state, for example, the vehicle speed V is higher than the predetermined value V0, the steering torque T is equal to or smaller than the predetermined value T0, and the rotational speed ω of the three-phase brush-less motor 100 is lower than the predetermined value ω0. Based on such a determination result, the cogging torque compensation value Tcg which is a function of the steering torque T, the steering torque T which is calculated based on the vehicle speed V, and the vehicle speed V is added in the adder 123 to the d-axis current command value Id which is calculated in the current command value calculating portion 121, thereby performing correction.

First, to the controller, the steering torque T is input (step S10), the vehicle speed V is input (step S11), and the rotational position θ is input to calculate the rotational speed ω (step S12). The data inputs of steps S10 to S12 may be performed in any order. Then, the steering assist torque command value calculating portion 110 calculates the torque command value Tref, and supplies the value to the current command value calculating portion 121 (step S13). The current command value calculating portion 121 calculates the q-axis current command value Iq and the d-axis current command value Id (step S14).

Thereafter, the cogging torque compensation value calculating portion 111 determines; whether the vehicle speed V is higher than the predetermined value V0 or not (step S20); whether the steering torque T is equal to or smaller than the predetermined value T0 or not (step S21); and whether the rotational speed ω is lower than the predetermined value ω0 or not (step S22). If all of the conditions of steps S20 to S22 are satisfied, the cogging torque compensation value calculating portion 111 calculates the cogging torque compensation value Tcg which is the function f(T, V) of the steering torque T and the vehicle speed V (step S23), and supplies the value to the adder 123. The state determinations of steps S20 to S22, and the calculation of the cogging torque compensation value Tcg may be performed in any order.

Figure 3:
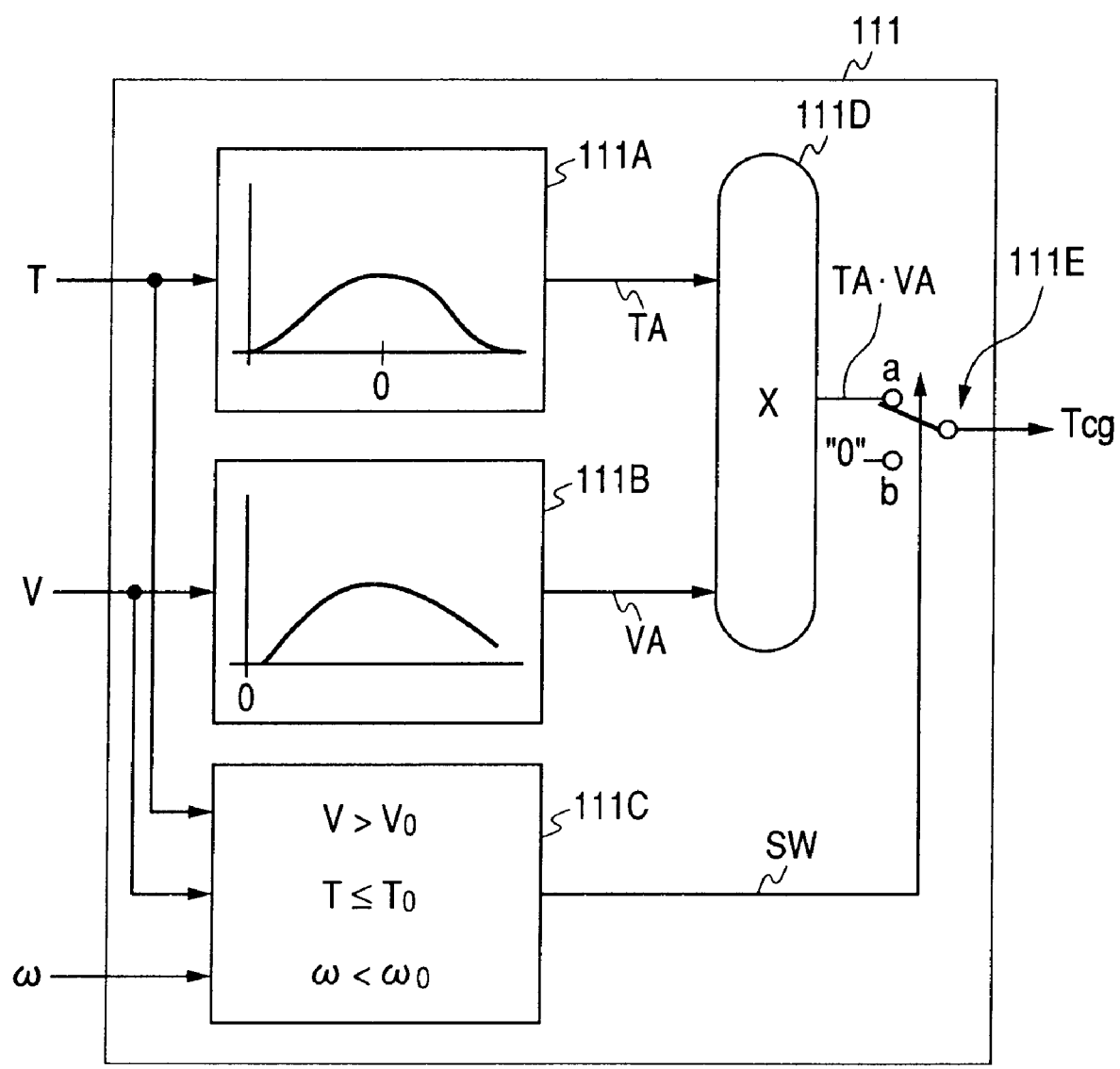
FIG. 3 is a block diagram showing a configuration example of a cogging torque compensation value calculating portion.

FIG. 3 shows a configuration example of the cogging torque compensation value calculating portion 111. The steering torque T is converted to a compensation value TA by a function portion 111A having illustrated characteristics, and the vehicle speed V is converted to a compensation value VA by a function portion 111B having illustrated characteristics. The compensation values TA and VA are supplied to a multiplying portion 111D, and the multiplication result TA·VA is supplied to a contact a of a switching portion 11E. The steering torque T, the vehicle speed V, and the rotational speed ω are supplied to a determining portion 111C to determine: whether the vehicle speed V is higher than the predetermined value V0 or not; whether the steering torque T is equal to or smaller than the predetermined value T0 or not; and whether the rotational speed ω is lower than the predetermined value ω0 or not. If all of the conditions are satisfied, the determining portion outputs a switching signal SW. The switching portion 111E has contacts a and b. The multiplication result TA·VA from the multiplying portion 111D is supplied to the contact a. A fixed value (=0) is supplied to the contact b. When the switching signal SW is not supplied, connection is made on the contact b, and, when the switching signal SW is supplied from the determining portion 111C, the contact is switched from "b" to "a". That is, if all of the conditions of V>V0, T≦T0, and ω<ω0 are satisfied, the cogging torque compensation value Tcg which is the function f(T, V) is added in the adder 123. In other cases, the fixed value (=0) is added in the adder 123, but correction is not performed because the value is "0".

In the vector control phase current command value calculating unit 120, the d-axis current command value Id calculated in the current command value calculating portion 121, and the cogging torque compensation value Tcg calculated in the cogging torque compensation value calculating portion 111 are added together in the adder 123, and the addition result (=Id+Tcg) is supplied as the new d-axis current command value Id' to the phase current command value calculating portion 122 (step S24).

Thereafter, or if any of the conditions of steps S20 to S22 is not satisfied, the phase current command value calculating portion 122 calculates the phase current command values Iaref, Ibref, Icref based on the q-axis current command value Iq and the d-axis current command value Id or Id' (step S30), and the three-phase brush-less motor 100 is driven in the same manner as described above (step S31).

Second Embodiment

Figure 4:
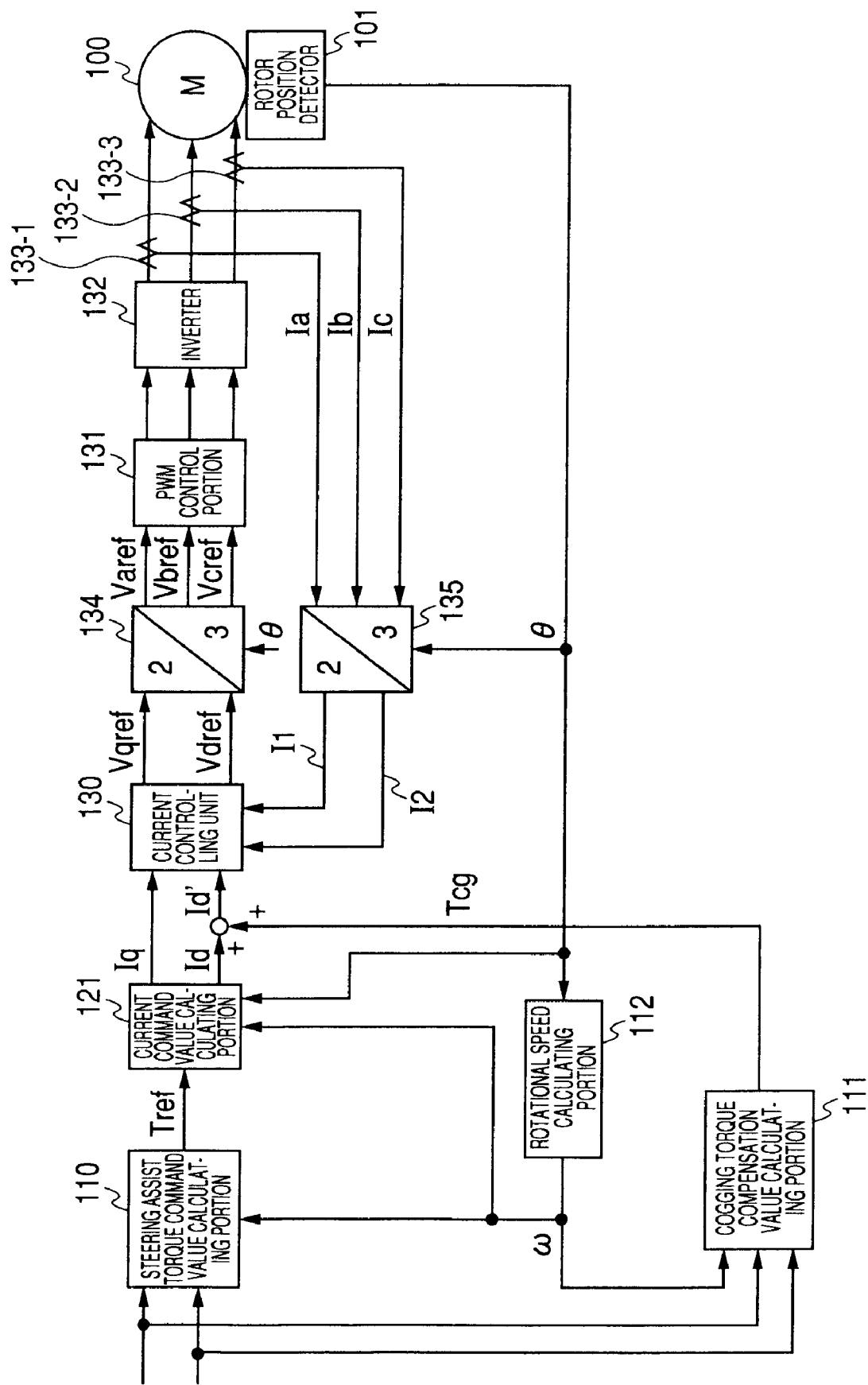
FIG. 4 is a block diagram showing a configuration example of the controller according to a second embodiment of the invention.

FIG. 4 shows a second embodiment of the invention in which a current-feedback is performed on the d-q axes. FIG. 4 is illustrated so as to correspond to FIG. 1. That is, the phase currents Ia, Ib, Ic from the current detectors 133-1, 133-2, 133-3 are converted to two-phase currents I1, I2 in a three to two-phase converter 135, and the current controlling unit 130 calculates two-phase voltage command values Vqref, Vdref. Namely, a current-feedback is performed on the d-q axes. The two-phase voltage command values Vqref, Vdref are supplied to a two to three-phase converter 134, and then converted to the three-phase voltage command values Varef, Vbref, Vcref based on the rotational angle θ. The operation after the voltage command values Varef, Vbref, Vcref is identical with that in FIG. 1.

Also in the current-feedback system on the d-q axes, the correction by the cogging torque compensation value calculating portion 111 can be similarly applied.

Figure 2:
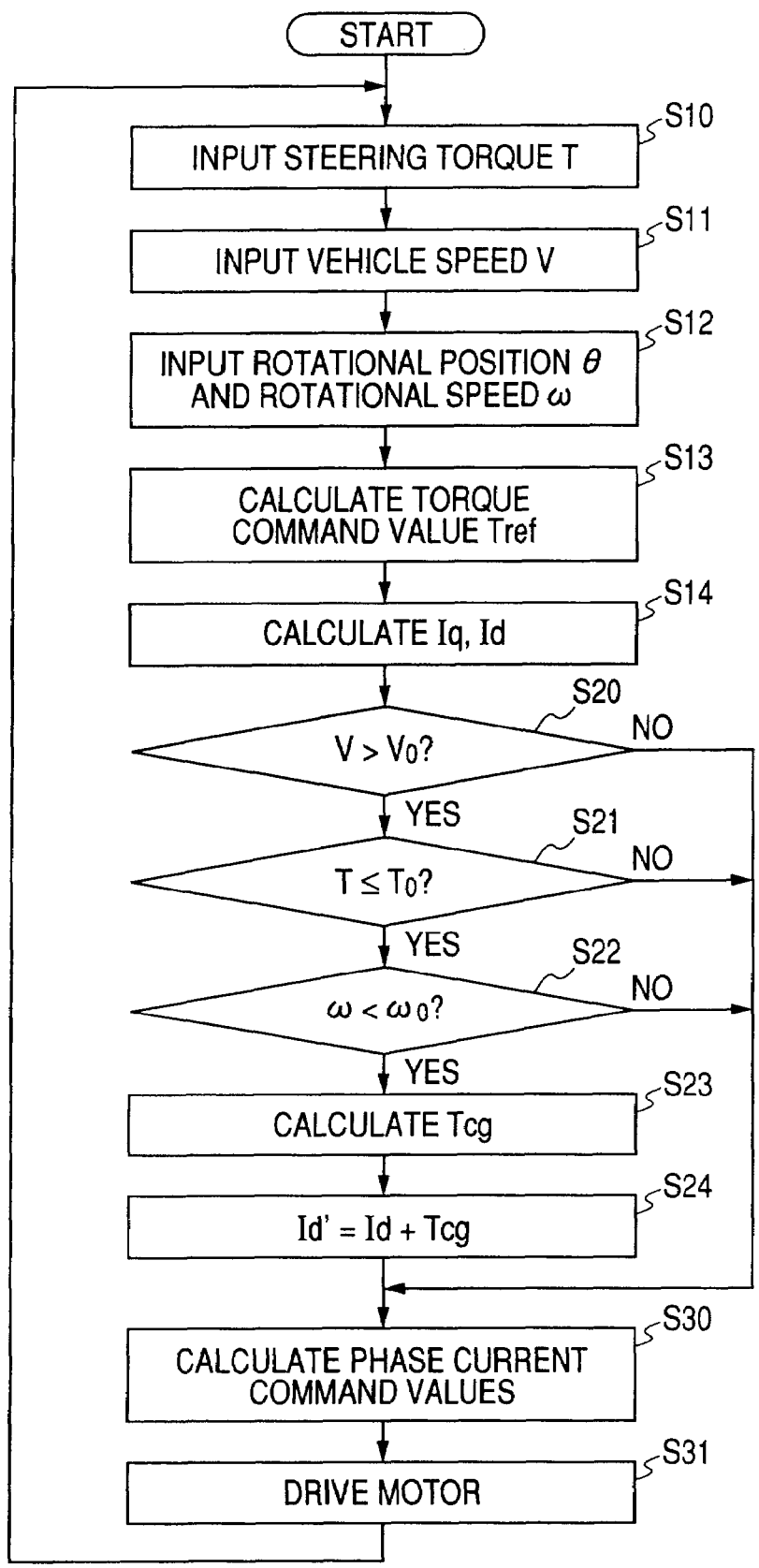
FIG. 2 is a flowchart showing an operation example in the first embodiment of the invention.
Figure 5:
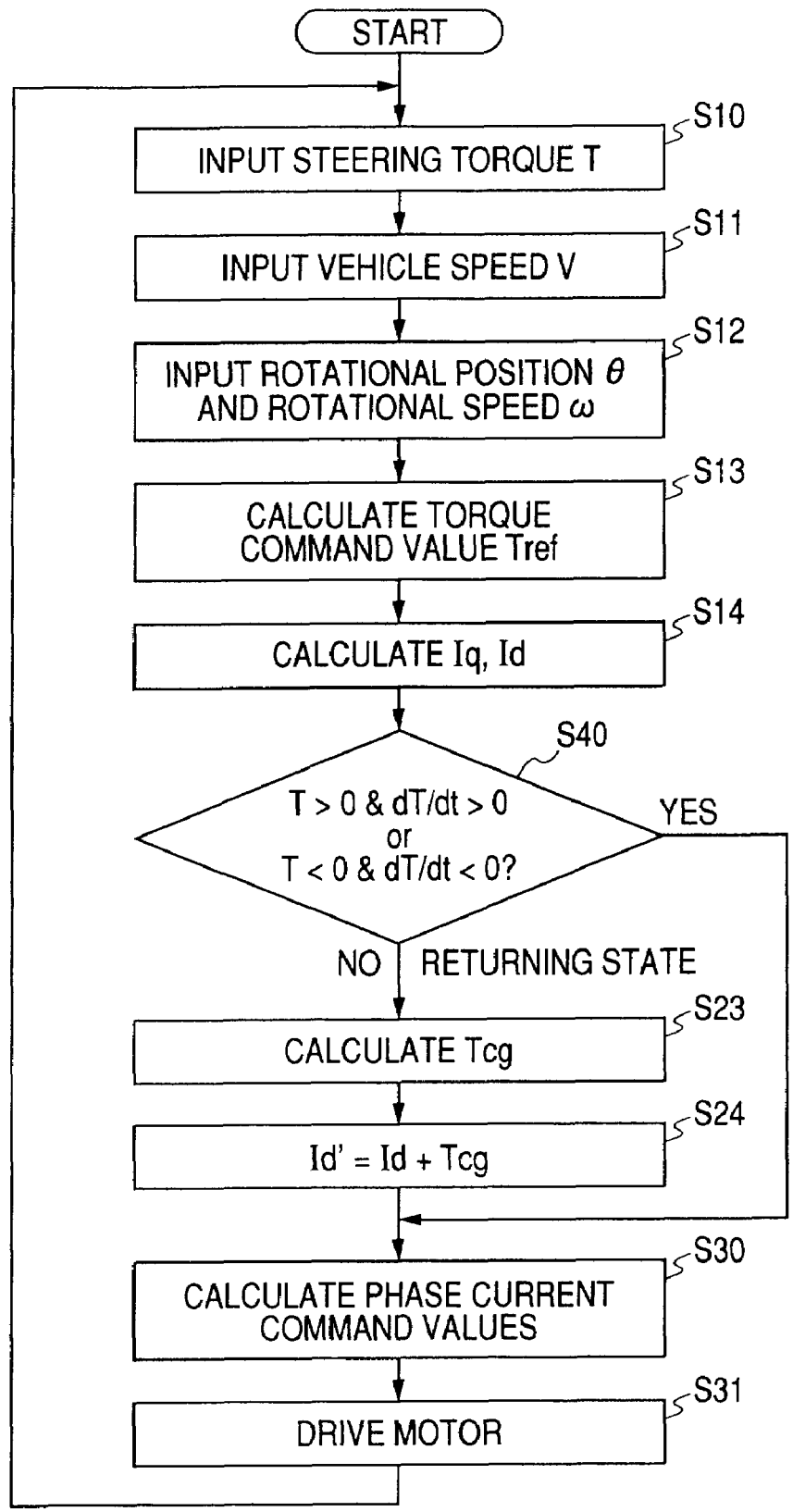
FIG. 5 is a flowchart showing an operation example in the case where a steering wheel returning state determining portion is provided.
Figure 6:
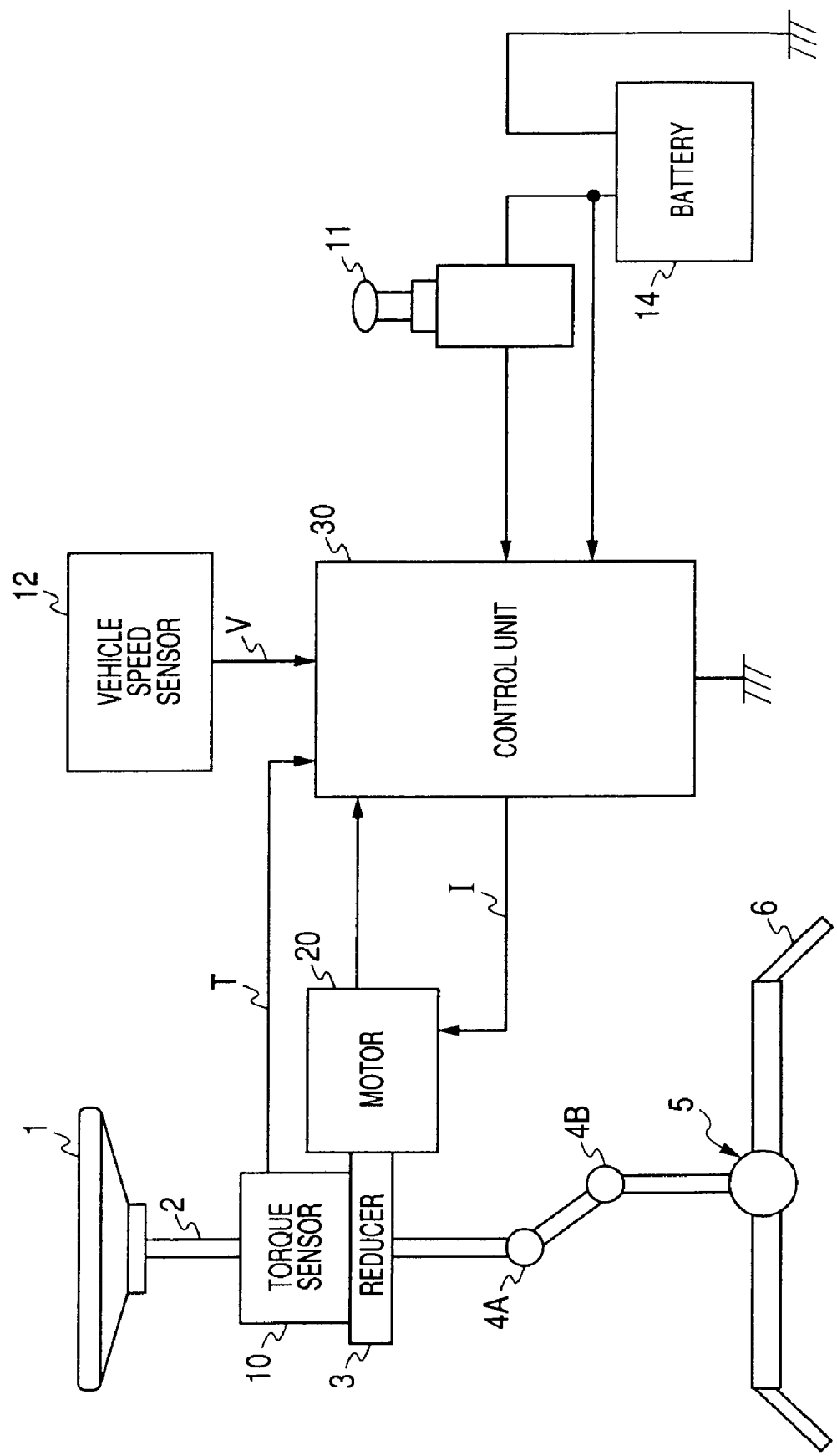
FIG. 6 is a view showing an example of a general configuration of an electric power steering apparatus.
Figure 7:
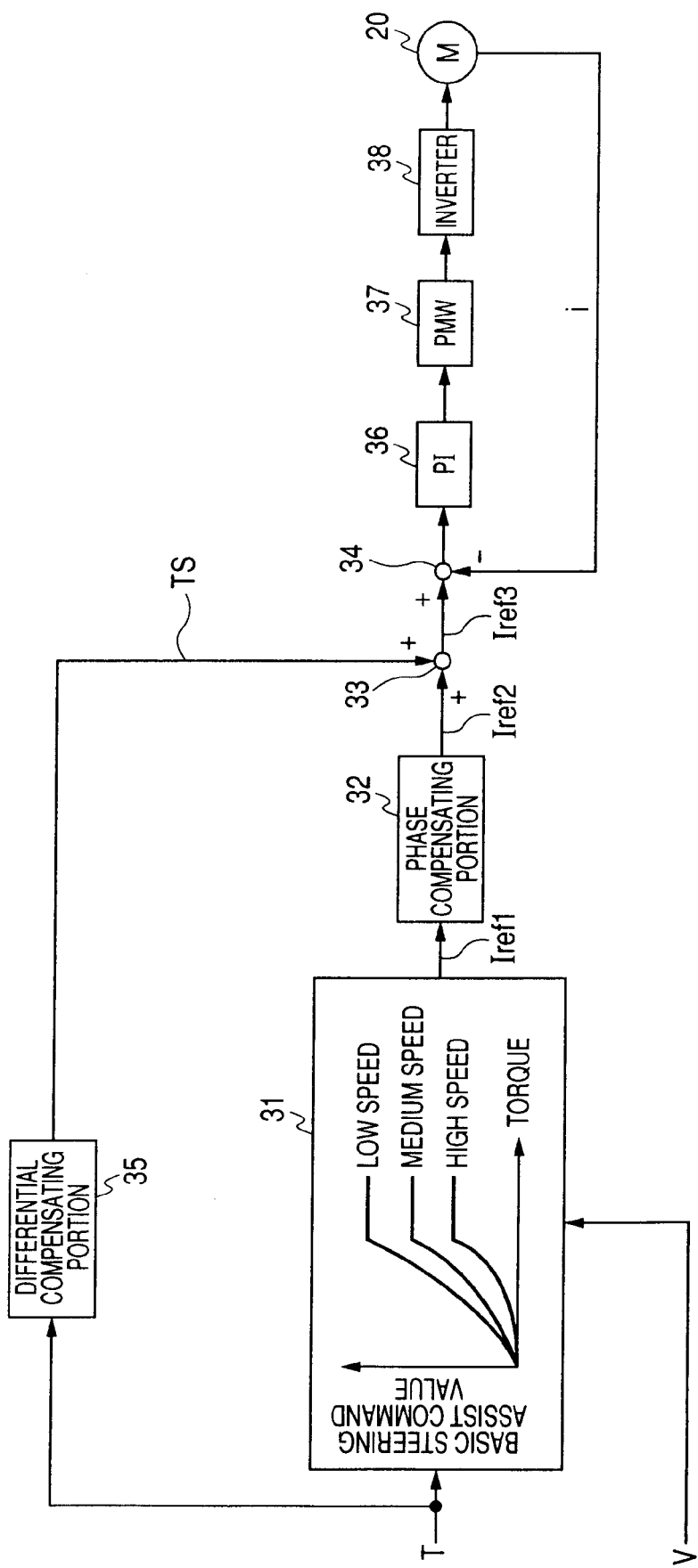
FIG. 7 is a block diagram showing a configuration example of a control unit.

The operation in the case where a steering wheel returning state determining portion which determines a steering wheel returning state is provided is performed as shown in the flowchart of FIG. 5 which corresponds to FIG. 2. The steering wheel returning state is determined depending on whether, as indicated in step S40, the steering torque T is positive and the derivative dT/dt which is the rate of change of the torque is positive (positive direction), or the steering torque T is negative and the derivative dT/dt which is the rate of change of the torque is negative (negative direction). When the steering wheel returning state is determined, the cogging torque compensation value Tcg which is the cogging torque compensation value is added to the d-axis current command value Id in the same manner as described above to compensate the command value.

In the above, the description has been made while taking a three-phase brush-less motor as an example. The invention can be applied to a brush-less motor having three or more phases.

Next, third and fourth embodiments relate to aspects of the invention in which a controller is provided with a friction compensation value calculating portion is described.

In the electric power steering apparatus of the invention, a brush-less DC motor (hereinafter, referred to merely as "brush-less motor") of three or more phases is used, attention is focused on the iron loss among the causes of loss torque, and the iron loss is reduced by the flux-weakening control. Namely, in a steering state which is easily affected by friction of the electric power steering apparatus, a friction compensation flux-weakening current is added to a d-axis current command value, thereby performing friction compensation.

Unlike the conventional art in which torque for compensating loss torque of a motor is generated, therefore, the iron loss can be physically reduced by weakening the flux of a motor.

Third Embodiment

Hereinafter, third embodiment of the invention will be described with reference to the accompanying drawings. In the embodiment of the invention, an example in which a three-phase brush-less motor is used as a steering assist motor will be described.

Figure 8:
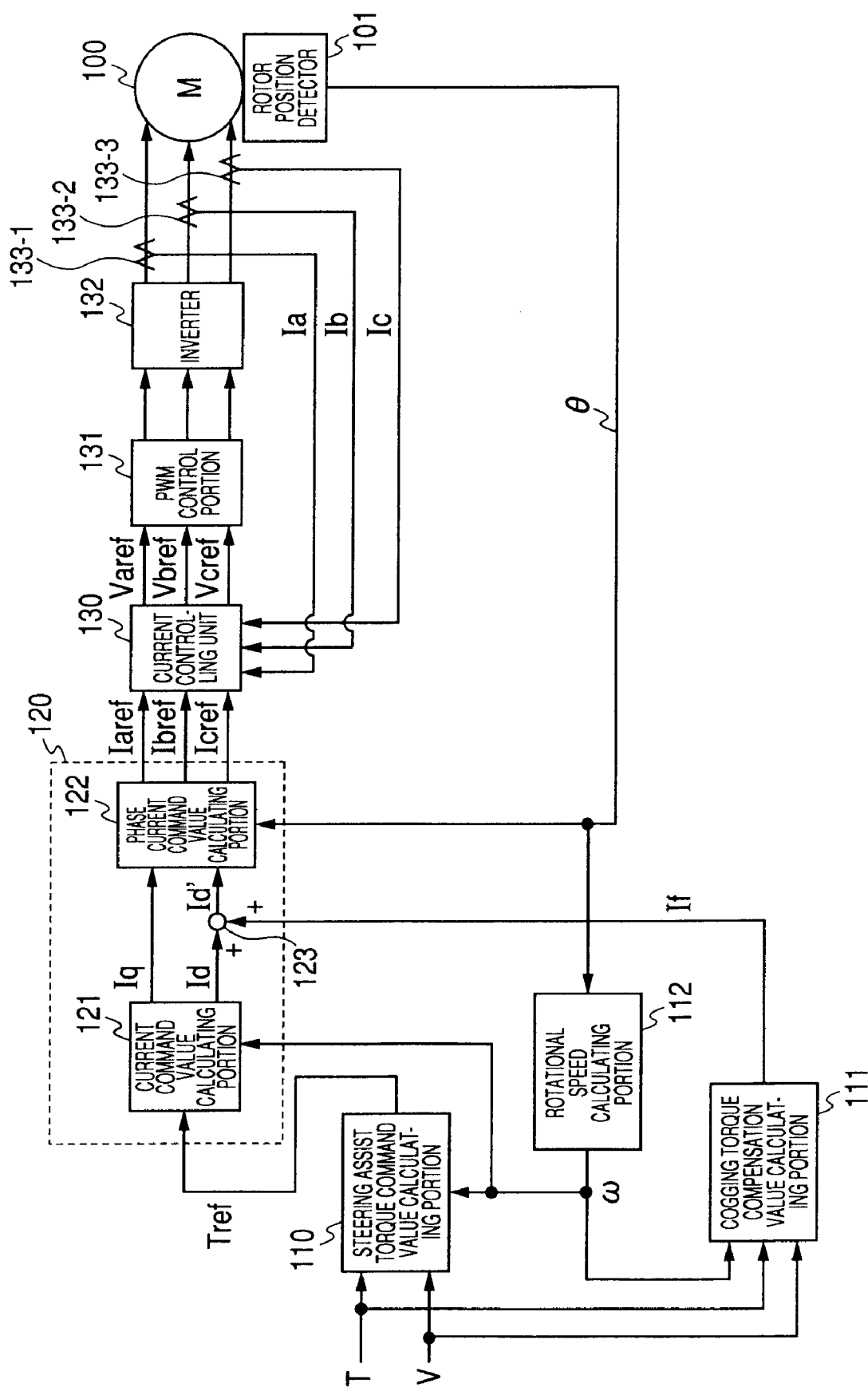
FIG. 8 is a block diagram showing a configuration example of the controller according to a third embodiment of invention.

FIG. 8 shows a configuration example of the controller according to the invention. The three-phase brush-less motor 1100 is drive-controlled by the vector control. In the vector control, the q-axis which is a coordinate axis of a rotor magnet, and which controls torque, and the d-axis for controlling the flux strength are independently set, and currents respectively corresponding to the axes are controlled by the vector because the axes are in a 90-deg. relationship. In the invention, a friction compensation flux-weakening current If which is calculated based on the steering torque T, the vehicle speed V, and the rotational speed ω is added to a d-axis current command value Id for the vector control, thereby performing friction compensation.

The three-phase brush-less motor 1100 which applies a steering assist force to a steering mechanism is provided with a rotor position detector 1101 which detects the rotational angle θ of the motor. The steering torque T from a torque sensor is supplied to a steering assist torque command value calculating portion 1110 and a friction compensation flux-weakening current calculating portion 1111. The rotational position θ from the rotor position detector 1101 is supplied to a rotational speed calculating portion 1112 which calculates the rotational speed ω. The rotational speed ω is supplied to the steering assist torque command value calculating portion 1110 and the friction compensation flux-weakening current calculating portion 1111, and also to a current command value calculating portion 1121 in vector control phase current command value calculating unit 1120.

A torque command value Tref which is calculated by the steering assist torque command value calculating portion 1110 based on the steering torque T, the vehicle speed V, and the rotational speed ω is supplied to the current command value calculating portion 1121 in the vector control phase current command value calculating unit 1120. Also the rotational speed ω from the rotational speed calculating portion 1112 is supplied to the current command value calculating portion 1121. The current command value calculating portion 1121 calculates a q-axis current command value Iq and the d-axis current command value Id based on the torque command value Tref and the rotational speed ω. The q-axis current command value Iq and the d-axis current command value Id are supplied to a phase current command value calculating portion 1122. The phase current command value calculating portion 1122 calculates three-phase current command values Iaref, Ibref, Icref based on the q-axis current command value Iq, the d-axis current command value Id, and the rotational position θ.

The d-axis current command value Id from the current command value calculating portion 1121 is not directly supplied to the phase current command value calculating portion 1122, but added in an adder 1123 to the friction compensation value (the friction compensation flux-weakening current) If from the friction compensation flux-weakening current calculating portion 1111 which functions as the friction compensation value calculating portion. A d-axis current command value Id' which is the addition value is supplied to the phase current command value calculating portion 1122.

The three-phase current command values Iaref, Ibref, Icref calculated by the phase current command value calculating portion 1122 are supplied to current controlling unit 1130 as current command values for a feedback system to obtain deviations from phase currents Ia, Ib, Ic which are supplied respectively from current detectors 1133-1, 1133-2, 1133-3 for detecting the phase currents of the motor. The current controlling unit 1130 outputs voltage command values Varef, Vbref, Vcref on which a control such as the PI control has been performed. The voltage command values Varef, Vbref, Vcref are supplied to a PWM control portion 1131 to drive the three-phase brush-less motor 1100 through an inverter 1132.

An example of the operation of the configuration will be described with reference to the flowchart of FIG. 9.

In the case where the steering wheel returns in a low-speed traveling state, or a steering operation is performed in the vicinity of the center in a high-speed straight traveling state, an assist current of the electric power steering apparatus is low in level, and hence the steering operation is easily affected by friction of the steering system. Therefore, returning of the steering wheel is poor, or the on-center feeling in a high-speed traveling state is impaired. In the invention, the friction compensation flux-weakening current calculating portion 1111 determines such a steering state based on the steering torque T, the vehicle speed V, and the rotational speed ω. In the case of a high-speed straight traveling state, for example, the vehicle speed V is higher than a predetermined value V0, the steering torque T is equal to or smaller than a predetermined value T0, and the rotational speed ω of the three-phase brush-less motor 1100 is lower than a predetermined value ω0. Based on such a determination result, the friction compensation flux-weakening current If is calculated as a function f(T, V, ω) of the steering torque T, the vehicle speed V, and the rotational speed ω, and then added in the adder 1123 to the d-axis current command value Id which is calculated in the current command value calculating portion 1121. The iron loss of the motor which is one kind of friction is generated by the magnetic fluxes of the motor. When the magnetic fluxes of the three-phase brush-less motor 1100 are weakened by the friction compensation flux-weakening current If, therefore, friction due to the iron loss can be reduced.

First, to the controller, the steering torque T is input (step S110), the vehicle speed V is input (step S111), and the rotational position θ is input to calculate the rotational speed ω (step S112). The data inputs of steps S110 to S112 may be performed in any order. Then, the steering assist torque command value calculating portion 1110 calculates the torque command value Tref, and supplies the value to the current command value calculating portion 1121 (step S113). The current command value calculating portion 1121 calculates the q-axis current command value Iq and the d-axis current command value Id (step S114).

Thereafter, the friction compensation flux-weakening current calculating portion 1111 determines: whether the vehicle speed V is higher than the predetermined value V0 or not (step S120); whether the steering torque T is equal to or smaller than the predetermined value T0 or not (step S121); and whether the rotational speed ω is lower than the predetermined value ω0 or not (step S122). If all of the conditions of steps S120 to S122 are satisfied, the friction compensation flux-weakening current calculating portion 1111 calculates the friction compensation flux-weakening current If which is the function f(T, V, ω) of the steering torque T, the vehicle speed V, and the rotational speed ω (step S123), and supplies the value to the adder 1123. The state determinations of steps S120 to S122 may be performed in any order.

With respect to the function f(T, V, ω), in order to correct lateral asymmetry of friction, for example, the friction compensation flux-weakening current If may be variable depending on the direction of the rotational speed ω. As the steering torque T is larger, the feeling of friction is further reduced. Therefore, the friction compensation flux-weakening current If may de varied depending on the steering torque. In order to adjust the on-center feeling, the friction compensation flux-weakening current If may be variable depending on the vehicle speed V.

Figure 10:
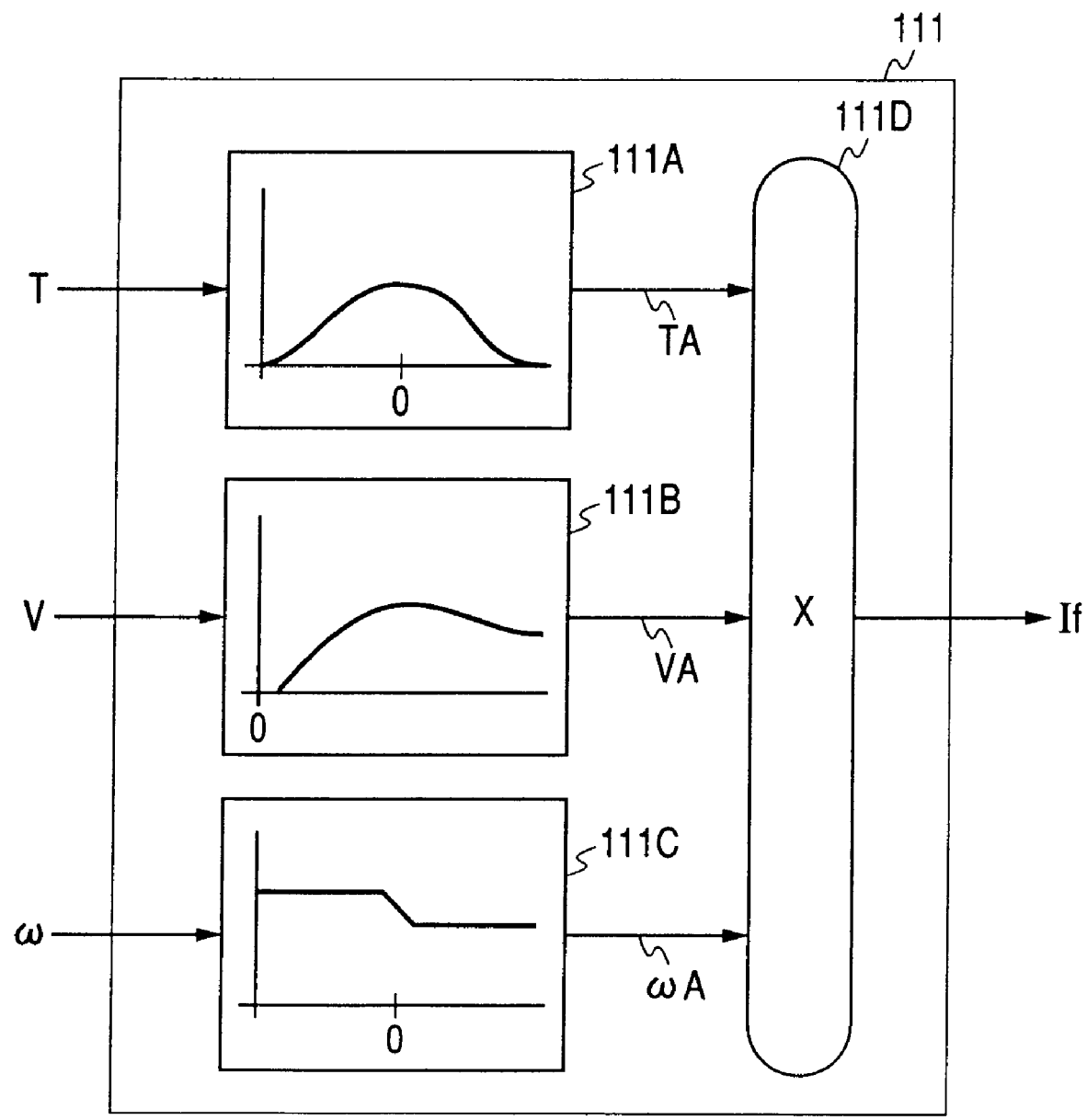
FIG. 10 is a block diagram showing a configuration example of a friction compensation flux-weakening current calculating portion.

FIG. 10 shows a configuration example of the friction compensation flux-weakening current calculating portion 1111. The steering torque T is converted to a compensation value TA by a function portion 1111A having illustrated characteristics, and the vehicle speed V is converted to a compensation value VA by a function portion 1111B having illustrated characteristics. When lateral asymmetry of friction is to be corrected, for example, the rotational speed ω has characteristics such as shown in a function portion 1111C, and is converted to a compensation value ωA. The steering torque TA, the vehicle speed VA, and the rotational speed ωA are supplied to a multiplying portion 1111D, and then output as a function (TA×VA×ωA), i.e., the friction compensation flux-weakening current If of the function f(T, V, ω).

In the vector control phase current command value calculating unit 1120, the d-axis current command value Id calculated in the current command value calculating portion 1121, and the friction compensation flux-weakening current If calculated in the friction compensation flux-weakening current calculating portion 1111 are added together in the adder 1123, and the addition result (=Id+If) is supplied as the new d-axis current command value Id' to the phase current command value calculating portion 1122 (step S124).

Thereafter, or if any of the conditions of steps S120 to S122 is not satisfied, the phase current command value calculating portion 1122 calculates the phase current command values Iaref, Ibref, Icref based on the q-axis current command value Iq and the d-axis current command value Id or Id' (step S130), and the three-phase brush-less motor 1100 is driven in the same manner as described above (step S131).

Fourth Embodiment

Figure 11:
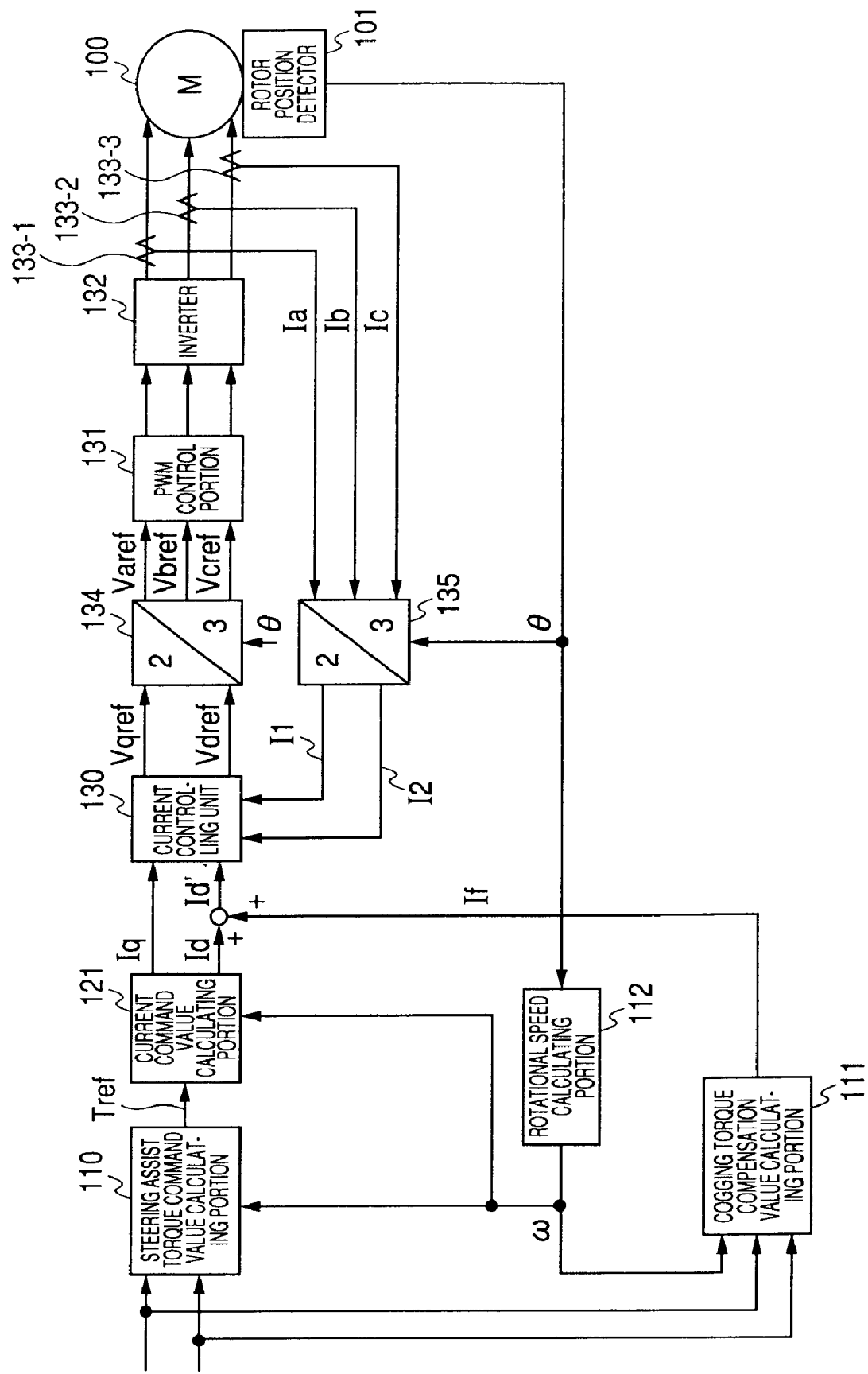
FIG. 11 is a block diagram showing a configuration example of the controller according to a fourth embodiment of the invention.

FIG. 11 shows a fourth embodiment of the invention in which a current-feedback is performed on the d-q axes. FIG. 11 is illustrated so as to correspond to FIG. 8. That is, the phase currents Ia, Ib, Ic from the current detectors 1133-1, 1133-2, 1133-3 are converted to two-phase currents I1, I2 in a three to two-phase converter 1135, and the current controlling unit 1130 calculates two-phase voltage command values Vqref, Vdref. Namely, a current-feedback is performed on the d-q axes. The two-phase voltage command values Vqref, Vdref are supplied to a two to three-phase converter 1134, and then converted to the three-phase voltage command values Varef, Vbref, Vcref based on the rotational angle θ. The operation after the voltage command values Varef, Vbref, Vcref is identical with that in FIG. 8.

Also in the current-feedback system on the d-q axes, the correction by the friction compensation flux-weakening current calculating portion 1111 can be similarly applied.

Figure 9:
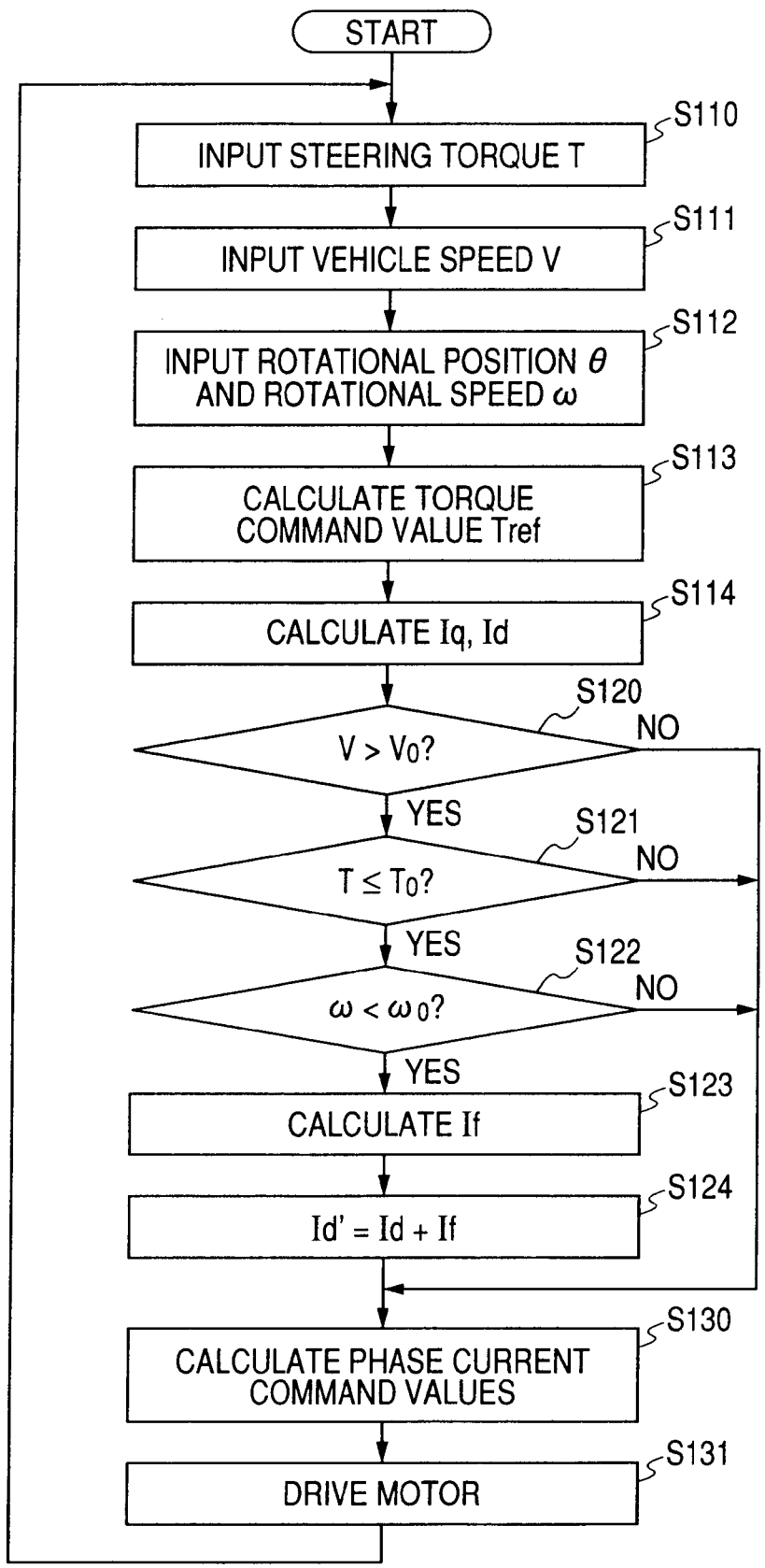
FIG. 9 is a flowchart showing an operation example in the third embodiment of the invention.

The operation in the case where a steering wheel returning state determining portion which determines a steering wheel returning state is provided is performed as shown in the flowchart of FIG. 12 which corresponds to FIG. 9. The steering wheel returning state is determined depending on whether, as indicated in step S140, the steering torque T is positive and the derivative dT/dt which is the rate of change of the torque is positive (positive direction), or the steering torque T is negative and the derivative dT/dt which is the rate of change of the torque is negative (negative direction). When the steering wheel returning state is determined, the friction compensation flux-weakening current If which is the friction compensation value is added to the d-axis current command value Id in the same manner as described above, to compensate the command value.

In the above, the description has been made while taking a three-phase brush-less motor as an example. The invention can be applied to a brush-less motor having three or more phases.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A controller for an electric power steering apparatus comprising a motor which applies a steering assist force to a steering mechanism, the controller comprising:
   a torque command value calculating portion which calculates a torque command value based on a steering torque generated in a steering shaft, and a vehicle speed;
   a current command value calculating portion which calculates a current command value for the motor based on the torque command value, the motor being controlled based on the current command value; and
   a cogging torque compensation value calculating portion which calculates a cogging torque compensation value for the motor,
   wherein the current command value is corrected based on the cogging torque compensation value, and
   wherein the current command value calculating portion calculates a d-axis current command value and a q-axis current command value in d-q axes of the motor, and corrects the d-axis current command value based on the cogging torque compensation value so as to weaken flux of the motor.

2. The controller for the electric power steering apparatus according to claim 1, wherein the cogging torque compensation value calculating portion calculates the cogging torque compensation value based on the steering torque and the vehicle speed.

3. The controller for the electric power steering apparatus according to claim 1, wherein the cogging torque compensation value is a function of the steering torque.

4. The controller for the electric power steering apparatus according to claim 3, wherein the function has characteristics that outputs a cogging torque compensation value which is more decreased as an absolute value of the steering torque is increased.

5. The controller for the electric power steering apparatus according to claim 1, wherein correction of the current command value according to the cogging torque compensation value is switched over in accordance with predetermined conditions.

6. An electric power steering apparatus comprising:
a motor which applies a steering assist force to a steering mechanism;
a torque sensor which detects steering torque generated in a steering shaft; and
a rotational speed detecting portion which detects a rotational speed of the motor,
wherein, when a vehicle speed is higher than a predetermined value, the steering torque is equal to or smaller than predetermined torque, and the rotational speed is equal to or lower than a predetermined rotational speed, a cogging torque compensation value is added to a d-axis current value in d-q axes of the motor so as to correct the d-axis current value.

7. A controller for an electric power steering apparatus comprising a motor which applies a steering assist force to a steering mechanism, the controller comprising:
a torque command value calculating portion which calculates a torque command value based on a steering torque generated in a steering shaft and a vehicle speed;
a current command value calculating portion which calculates a current command value for the motor based on the torque command value, the motor being controlled based on the current command value; and
a friction compensation value calculating portion which calculates a friction compensation value for the motor,
wherein the current command value is corrected based on the friction compensation value,
wherein the friction compensation value calculating portion calculates the friction compensation value based on the steering torque, the vehicle speed, and the rotational speed of the motor, and
wherein the current command value calculating portion calculates a d-axis current command value and a q-axis current command value in d-q axes of the motor, and corrects the d-axis current command value based on the friction compensation value so as to weaken a flux of the motor.

8. The controller for the electric power steering apparatus according to claim 7, wherein the friction compensation value is a function of the steering torque, the vehicle speed, and the rotational speed of the motor.

9. The controller for the electric power steering apparatus according to claim 7, wherein the function has characteristics that outputs a friction compensation value which is decreased in accordance with an increase of an absolute value of the steering torque.

10. The controller for the electric power steering apparatus according to claim 7, wherein the function has characteristics that outputs the friction compensation value, when the vehicle speed is equal to or higher than a predetermined vehicle speed value.

11. The controller for the electric power steering apparatus according to claim 7, wherein the function has characteristics that outputs the friction compensation value, when the rotational speed is equal to or lower than a predetermined rotational speed value.

12. The controller for the electric power steering apparatus according to claim 7, wherein the controller further comprises a steering wheel returning state determining portion which determines a steering wheel returning state, and, when the steering wheel returning state is detected, adds the friction compensation value to the d-axis current command value to correct the command value.

13. An electric power steering apparatus comprising:
a motor which applies a steering assist force to a steering mechanism;
a torque sensor which detects steering torque generated in a steering shaft; and
a rotational speed detecting portion which detects a rotational speed of the motor,
wherein, when the steering torque is equal to or smaller than a predetermined torque value and the rotational speed is equal to or lower than a predetermined rotational speed value, a d-axis current value in d-q axes of the motor is set equal to or larger than a predetermined current value.

* * * * *